(12) United States Patent
Pandura

(10) Patent No.: US 7,163,116 B2
(45) Date of Patent: Jan. 16, 2007

(54) ASH RECEIVER OR SIMILAR RECEPTACLE

(75) Inventor: Michael Pandura, Weinsberg (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 453 days.

(21) Appl. No.: 10/622,137

(22) Filed: Jul. 18, 2003

(65) Prior Publication Data

US 2004/0094547 A1 May 20, 2004

(30) Foreign Application Priority Data

Jul. 18, 2002 (DE) .............................. 102 32 600

(51) Int. Cl.
*B65D 21/02* (2006.01)

(52) U.S. Cl. .................. 220/23.87; 220/8; 296/37.9

(58) Field of Classification Search .............. 220/8, 220/23.87, 250, 260, 262, 908.1, 911; 224/278, 224/483; 296/37.8, 37.9, 37.11, 37.12, 37.14
See application file for complete search history.

(56) References Cited

U.S. PATENT DOCUMENTS

| | | | |
|---|---|---|---|
| 1,820,555 A * | 8/1931 | Buschman | .................. 220/263 |
| 1,842,654 A | 1/1932 | Brandt | |
| 1,880,752 A | 10/1932 | Brandt | |
| 2,559,361 A | 7/1951 | Langel | ......................... 220/33 |
| 2,946,474 A * | 7/1960 | Knapp | ..................... 220/23.87 |
| 4,799,604 A | 1/1989 | Okojima et al. | |
| 4,927,108 A * | 5/1990 | Blazic et al. | ............. 248/311.2 |

FOREIGN PATENT DOCUMENTS

| | | | |
|---|---|---|---|
| DE | 4421666 C1 * | 6/1995 | |
| DE | 44 27 868 | 2/1996 | |

* cited by examiner

*Primary Examiner*—Nathan J. Newhouse
*Assistant Examiner*—Harry Grosso
(74) *Attorney, Agent, or Firm*—Crowell & Moring LLP

(57) ABSTRACT

An ashtray for automobiles exhibits a holder and a removable ashtray that is inserted in the holder, whereby a lifting mechanism is provided for lifting the ashtray from a usage position into an easy-grip position for removal. The lifting mechanism includes an actuator element, which is adjustable at the holder and a transmission element acting together with it. A lifting mechanism exhibiting a simple, cost-efficient construction is created in that the transmission element is in an operating connection with a pivotal lever hinged to the holder in such a manner that, when shifting the actuator element, the pivotal lever makes an arc shaped movement, during the course of which a rounded upper end area of the pivotal lever comes into contact with the underside of the ashtray, and moves it up towards the easy grip-position for removal.

20 Claims, 4 Drawing Sheets

ASH RECEIVER OR SIMILAR RECEPTACLE

BACKGROUND AND SUMMARY OF THE INVENTION

This application claims the priority of German Application No. 102 32 600.2 filed Jul. 18, 2002, the disclosure of which is expressly incorporated by reference herein.

The invention relates to an ashtray or a similar receptacle, especially for automobiles, with a holder and a removable ashtray in the holder, whereby a lifting mechanism is provided for removing the ashtray from a usage position into an easy-grip position for removal, which lifting mechanism includes an adjustable actuator element in the holder.

An ashtray for automobiles is known from German Patent Document No. DE 44 27 868 C2, whereby the adjustable ashtray, which is inserted into the holder, can be displaced from a usage position to an easy-grip position for removal by means of a lifting mechanism.

In this arrangement, the lifting mechanism includes an adjustable actuator element in the holder, which is connected by means of a transmission element, which is designed as a slider. At the end of the slider, an inclined surface is provided, which comes into contact with the corresponding inclined working surface of the ashtray when the slider is shifted.

An object of the invention is to create an alternative lifting mechanism for a removable ashtray, which comprises a simple, cost-efficient construction.

According to the invention, this object is achieved providing an ashtray assembly for automobiles, including a holder and a removable ashtray in the holder, whereby a lifting mechanism is provided for moving the ashtray from a usage position into an easy-grip position for removal, which lifting mechanism includes an adjustable actuator element at the holder, and a transmission element, which works together with the actuator element, wherein the transmission element is in an operating connection with a hinged pivotal lever at the holder so that when shifting the actuator element, the pivotal lever makes an arc shaped motion, during the course of which a rounded upper end area of the pivotal lever comes in contact with a bottom side of the ashtray and thereby moves the ashtray up towards the easy-grip position for removal. Further advantageous features of the invention are described herein and in the claims.

Important advantages achieved by certain preferred embodiments of the invention include the feature that the lifting mechanism, comprises an actuator element, a transmission element and a pivotal lever, exhibits a simple, cost-efficient construction. The transmission element can be realized as a lever, as a linkage, as a slider and the like. The relatively short pivotal lever is, with the area of its lower end, pivoted at a vertical wall of the holder. At a distance from this linkage, an area of the transmission element not facing the actuator element engages into the pivoted lever. For the exact guidance of the pivotal lever, a protruding pin is arranged on it, which is in an operating connection with the slot opening that is shaped as a curved arc, preferably a circular arc section. By means of a cam-shaped realization of an upper edge area of the pivot lever, a simple lift of the ashtray is achieved.

Other objects, advantages and novel features of the present invention will become apparent from the following detailed description of the invention when considered in conjunction with the accompanying drawings.

DETAILED DESCRIPTION OF THE DRAWINGS

Figure 1:
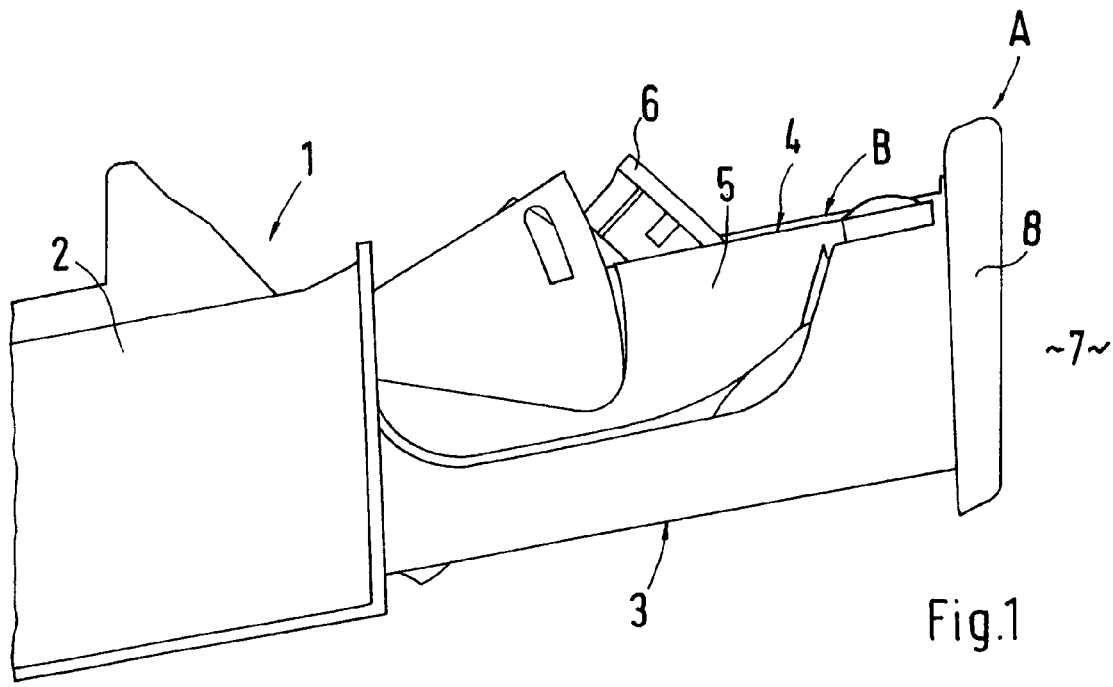
FIG. 1 is a side view of an ashtray with a drawn out holder and an inserted ashtray in the usage position constructed according to a preferred embodiment of the invention.

In FIGS. 1 to 4, an ashtray 1 is shown that is installed on the dashboard or on a console of an automobile, which includes an assemblage-side attached mount 2 and an ashtray insert 3, which is inserted into the mount 2 like a drawer. The ashtray insert 3, which is formed as an injection molded part from plastic, can be shifted via lateral guides from a closed position (not shown) to open position A, as shown in FIGS. 1 to 4 and vice versa. This open and closing structure for insert 3 is not shown in detail as one skilled in the art can readily understand the same based on prior art arrangements. The ashtray insert 3 comprises a holder 4, into which a removable ashtray 5 can be inserted from above or from the side. A cigarette lighter 6 is provided in a lateral position (compare FIG. 5), next to the ashtray 5. Facing the passenger compartment 7, the ashtray insert 3 exhibits a decorative plate 8.

For lifting the ashtray 5 from a usage position B (FIG. 1) into an easy-grip position for removal C (FIG. 2), a lifting mechanism 9 is provided, which lifting mechanism comprises an adjustable holder and an adjustable actuator element 10, a transmission element 11 and a pivotal lever 12.

The lifting mechanism 9 operates in such a way that the pivotal lever 12 makes a curved arc shaped movement when the actuator element 10 is shifted in the direction of the arrow R (in transverse vehicle direction), in the course of which a rounded upper end 13 of the pivotal lever 12 comes into contact with a bottom part 14 of the ashtray 5, and moves the ashtray 5 up towards the easy-grip position C for removal. The actuator element 10 is arranged laterally, next to the ashtray 5, that is, it is disposed in front of the cigarette lighter 6. At a flat, more or less horizontal wall 15 of the holder 4, a rectilinear transverse running slot opening 16 is realized, which serves as a guide for the actuator element 10 during the shifting movement. The actuator element 10 penetrates the slot opening 16 and extends above, as well as beneath, the wall 15. The area of the actuator element 10 running beneath the wall 15 is connected to a side of the transmission element 11, which faces away from the pivotal lever 12.

Figure 3:
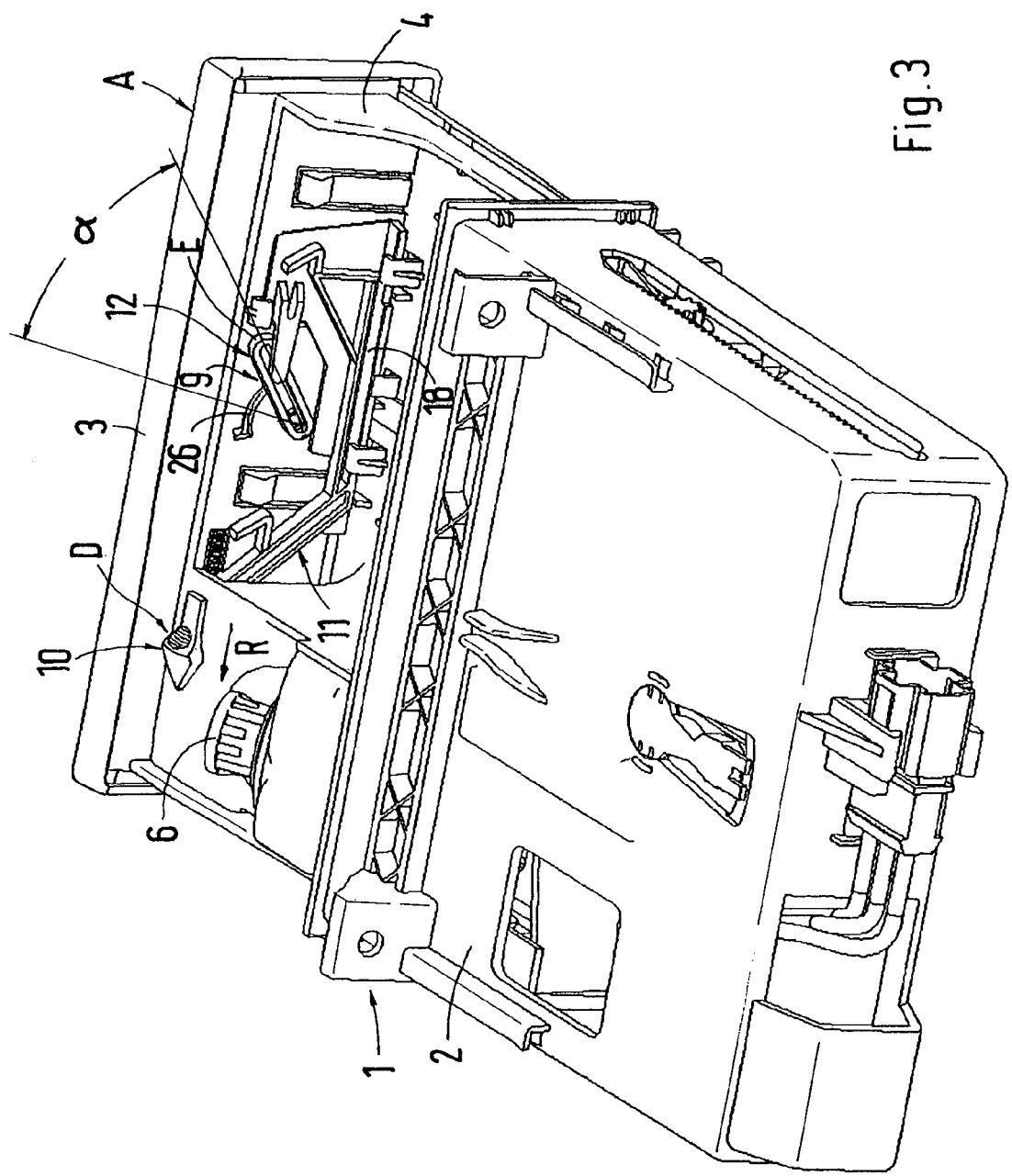
FIG. 3 is , a perspective view of the lifting mechanism of the assembly of FIGS. 1 and 2, shown in a usage position of the ashtray.
Figure 4:
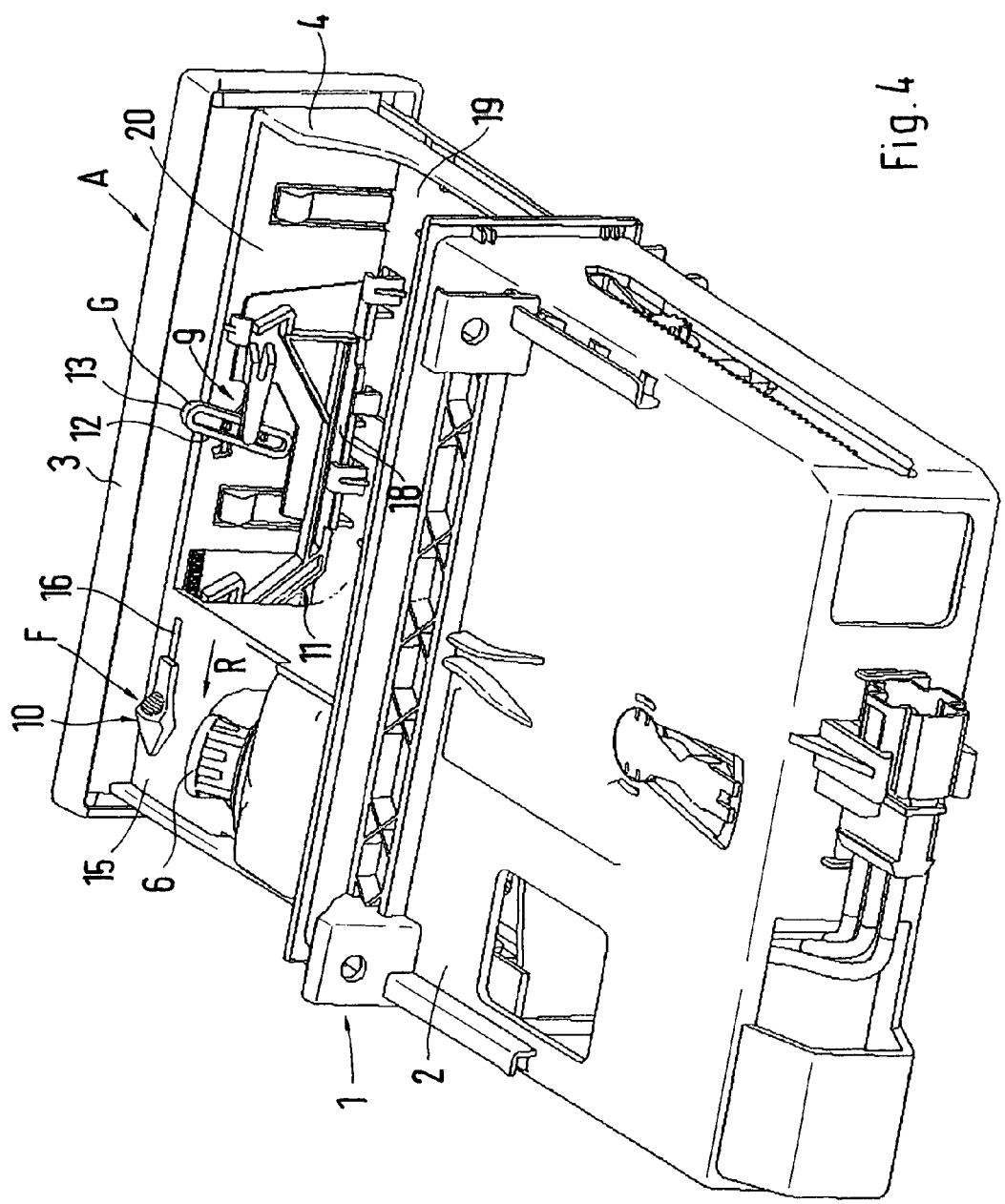
FIG. 4 is a view of the lifting mechanism of the assembly of FIGS. 1 and 2, shown in the removal position of the ashtray.

In usage position B of the ashtray 5, the actuator element assumes position D. In FIGS. 3 and 4, the transmission element 11 is realized as a slider 18, which slider 18 adjustably mounted on the floor wall 19 and the vertical front wall 20 of the holder 4 for movement in a transverse direction.

Figure 5:
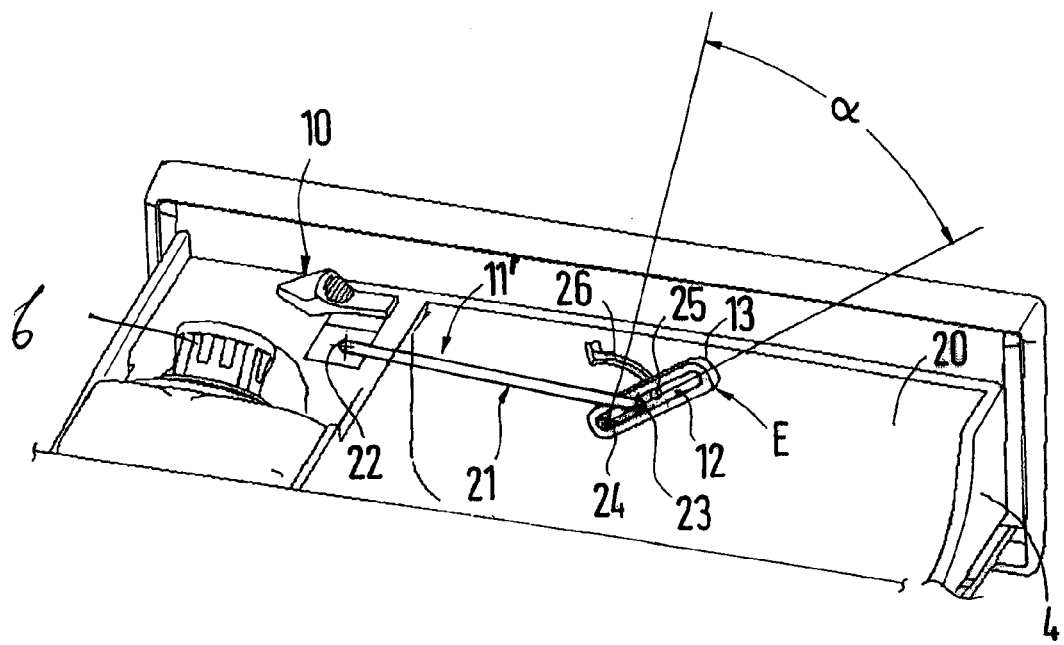
FIG. 5 is a view from above of a second embodiment of a lifting mechanism.
Figure 6:
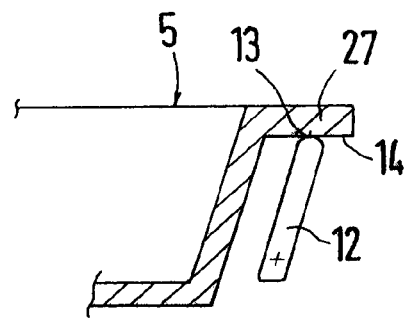
FIG. 6 is a cross-sectional view of an edge area of the ashtray and the lifting mechanism disposed underneath the ashtray.

The transmission element 11 may, however, also be realized as a lever 21 (FIG. 5), as a bar or the like. A transmission element 11 realized in a simple form is shown in FIG. 5. One end 22 of the lever 21 is thereby hingedly connected with the actuator element 10, whereas the other end 23 is in direct operating connection with the pivotal lever 12. The pivotal lever 12, which extends in a vertical direction, is connected to the inner side of the vertical wall 20 of the holder 4 with its lower end area 24 around an axis running in a lengthwise direction. At a distance to its holder-side steering, the pivotal lever 12 is hinged with the transmission element 11, which is arranged above it. The upper edge area 13 of the pivotal lever 12 exhibits a rounded form. Edge area 13 is preferably realized in a cam shape, in order to guarantee a good load transmission. For the exact guidance of the pivotal lever 12 in the course of its swiveling movement, it locally exhibits a protruding pin 25, which is engaged in an arc shaped slot opening 26, which is provided at the vertical wall 20 of the holder 4. In the usage position B of the ashtray 5, the pivotal lever 12 assumes the position E (FIGS. 1 and 3). Thereby the upper edge area 13 of the pivotal lever 12 runs at a smaller distance to the upper-laterally placed side flange 27 of the ashtray 5. The actuator element is in position D.

Figure 2:
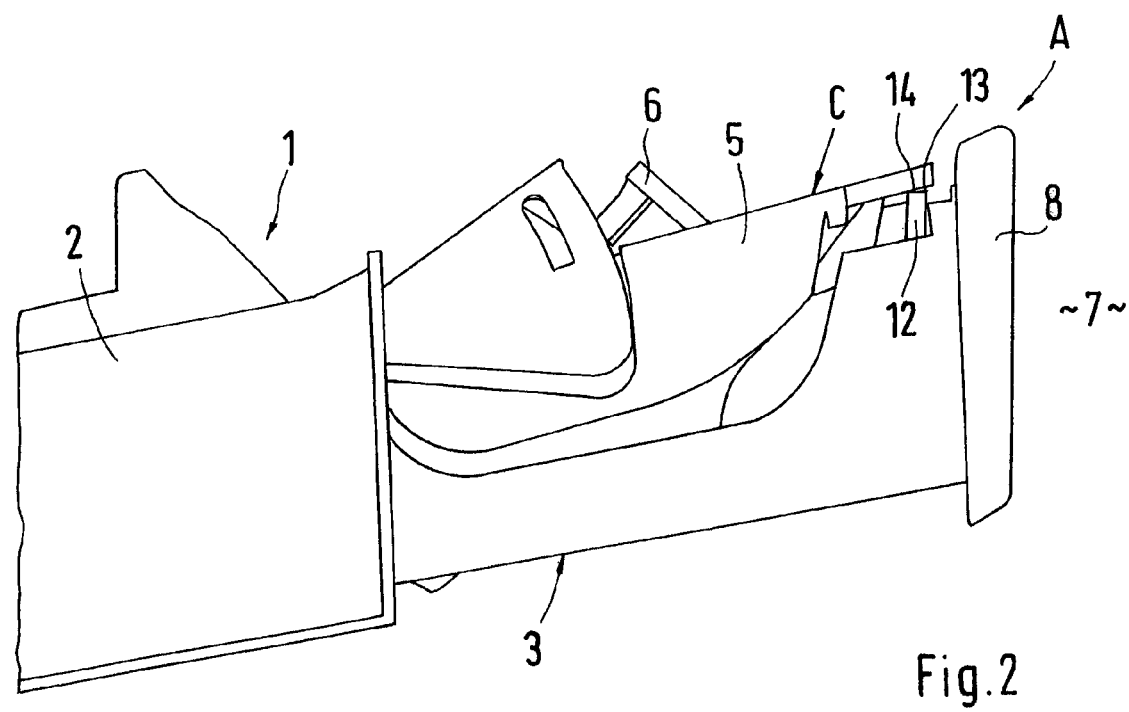
FIG. 2 is a view similar to FIG. 1 showing the ashtray in a lifted, easy grip-position for removal.

For lifting the ashtray 5, the actuator element 10 is moved in a transverse direction to the vehicle, in the direction of the arrow R, up to position F (FIG. 4). Thereby the transmission element 11 also causes a lengthwise motion in the direction of the arrow R, and the pivotal lever 12 is swiveled by an angle α in a counter clockwise direction to a position G (FIG. 4). During an arc shaped swiveling motion around angle α, the upper edge area 13 comes into contact with the lower side 14 of the edge flange 27 of the ashtray 5 and raises it by a defined degree into the removal position C (FIG. 2). In certain preferred embodiments the arc shape is the form of a section of a circle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Ashtray assembly for automobiles comprising a mount and an insert arranged to be movably guided in a draw-like manner in a housing in a first direction, the insert comprising a holder and a removable ashtray in the holder in a second direction substantially transverse to the first direction, whereby a lifting mechanism is provided for moving the ashtray from a usage position into an easy-grip position for removal which lifting mechanism includes an adjustable actuator element at the holder, and a transmission element operatively cooperating with the actuator element, wherein the transmission element is in an operating connection with a hinged pivotal lever at the holder so that when shifting the actuator element, the pivotal lever makes an arc shaped motion, during the course of which a rounded upper end area of the pivotal lever comes in contact with a bottom side of the ashtray and thereby moves the ashtray up towards the easy-grip position for removal.

2. Ashtray assembly according to claim 1, wherein the pivotal lever is hinged at its lower end area with the holder.

3. Ashtray assembly according to claim 1, wherein the pivotal lever is hinged with the transmission element at a distance from a holder-side mount for the transmission element.

4. Ashtray assembly according to claim 1, wherein the transmission element is formed as one of a lever, a linkage, and a slider.

5. Ashtray assembly according to claim 4, wherein the transmission element is a lever.

6. Ashtray assembly according to claim 4, wherein the transmission element is a linkage.

7. Ashtray assembly according to claim 4, wherein the transmission element is a slider.

8. Ashtray according to claim 1, wherein the upper end area of the pivotal lever is realized in a cam shape.

9. Ashtray assembly according to claim 1, wherein, when lifted, the upper end area of the pivotal lever acts together with a bottom side of a laterally placed edge-side flange of the holder.

10. Ashtray assembly for automobiles including a holder and a removable ashtray in the holder, whereby a lifting mechanism is provided for moving the ashtray from a usage position into an easy-grip position for removal, which lifting mechanism includes an adjustable actuator element at the holder, and a transmission element, which works together with the actuator element, wherein the transmission element is in an operating connection with a hinged pivotal lever at the holder so that when shifting the actuator element, the pivotal lever makes an arc shaped motion, during the course of which a rounded upper end area of the pivotal lever comes in contact with a bottom side of the ashtray and thereby moves the ashtray up towards the easy-grip position for removal, and wherein the pivotal lever exhibits a protruding pin locally, which acts together with a arc-shaped slot opening realized at the holder.

11. Receptacle assembly for vehicles, comprising:

a mount and an insert arranged to be guided in a drawer-like manner in the mount in a first direction, the insert comprising:

a holder, a removable receptacle carried by the holder, and a lifting mechanism operable to lift the receptacle from a first position to a second easy to grip position accommodating manual gripping and removal in a direction substantially transverse to the first direction of the receptacle from the holder, wherein said lifting mechanism includes:

a pivotal lifting lever provided with a curved cam surface at an end thereof spaced from a pivot connection of the lifting lever, a manually operable member carried by the holder and movable between a receptacle in use position and a receptacle lifted position, and a transmission link connected between the manually operable member and the lifting lever and operable to forceably pivot the lifting lever in response to movement of the manually operable member with the curved cam surface engaging and lifting the receptacle when the manually operable member is moved to the receptacle lifted position.

12. Assembly according to claim 11, wherein the receptacle is an ashtray.

13. Assembly according to claim 11, wherein the pivot connection of the lifting lever is at the holder.

14. Receptacle assembly for vehicles, comprising:

a holder, a removable receptacle carried by the holder, and a lifting mechanism operable to lift the receptacle from a first position to a second easy to grip position accommodating manual gripping and removal of the receptacle from the holder, wherein said lifting mechanism includes:

a pivotal lifting lever provided with a curved cam surface at an end thereof spaced from a pivot connection of the lifting lever, a manually operable member carried by the holder and movable between a receptacle in use position and a receptacle lifted position, and a transmission link connected between the manually operable member and the lifting lever and operable to forceably pivot the lifting lever in response to movement of the manually operable member with the curved cam surface engaging and lifting the receptacle when the manually operable member is moved to the receptacle lifted position, and wherein the transmission link is connected to the lifting lever intermediate the curved cam surface and the pivot connection.

15. Assembly according to claim 14, wherein the transmission link is guided in a slot at the lifting lever.

16. Assembly according to claim 15, comprising:

an arc shaped slot in said holder, and a guide pin engaged in the slot and connected to the lifting lever.

17. Assembly according to claim 16, wherein the receptacle is an ashtray.

18. Assembly according to claim 17, wherein the manually operable member is disposed at one lateral side of the ashtray for sliding movement in a lateral direction.

19. A receptacle assembly for vehicles, comprising:

a mount and an insert arranged to be guided in a drawer-like manner in the mount in a first direction, the insert comprising:

a holder, a removable receptacle carried by the holder, and a lifting mechanism for lifting in a direction substantially transverse to the first direction the receptacle from a first position to a second easy to grip position for accommodating manual gripping and removal of the receptacle from the holder, the lifting mechanism comprising an adjustable actuator element and a transmission element operatively associated with the actuator element and a hinged pivotal lever at the holder arranged such that when shifting the actuator element, the pivotal lever undergoes an arc-shaped movement and comes into contact with a bottom surface of the removable receptacle.

20. A receptacle assembly according to claim 19, wherein the receptacle is an ashtray.

* * * * *